United States Patent [19]

Bendtsen

[11] 4,440,041

[45] Apr. 3, 1984

[54] WINCH APPARATUS

[75] Inventor: Randall R. Bendtsen, Peoria, Ill.

[73] Assignee: Caterpillar Tractor Co., Peoria, Ill.

[21] Appl. No.: 309,341

[22] PCT Filed: Sep. 17, 1981

[86] PCT No.: PCT/US81/01252

§ 371 Date: Sep. 17, 1981

§ 102(e) Date: Sep. 17, 1981

[87] PCT Pub. No.: WO83/01089

PCT Pub. Date: Mar. 31, 1983

[51] Int. Cl.³ .................. F16H 3/44; F16D 25/10; F16D/25/061

[52] U.S. Cl. .................. 74/753; 192/3.57; 192/87.16; 192/87.19; 254/344; 254/345 F16D/25/061

[58] Field of Search .................. 74/770, 753; 92/131; 192/87.16, 87.19, 67 R, 3.57; 254/342, 344, 345

[56] References Cited

U.S. PATENT DOCUMENTS

| | | | |
|---|---|---|---|
| 2,092,580 | 9/1937 | Kelly | 92/131 |
| 2,527,727 | 10/1950 | Hobbs | 74/346 |
| 3,071,345 | 1/1963 | Glenn et al. | 253/59 |
| 3,352,392 | 11/1967 | Black et al. | 192/87.19 |
| 3,460,807 | 8/1969 | Prikhodko et al. | 254/344 |
| 3,465,851 | 9/1969 | Callegari et al. | 188/97 |
| 3,537,355 | 11/1970 | Bliss | 91/51 |
| 3,850,411 | 11/1974 | Vavilov et al. | 254/186 R |
| 4,048,799 | 9/1977 | Golan et al. | 60/413 |
| 4,085,920 | 4/1978 | Waudoit | 251/57 |
| 4,161,126 | 7/1979 | Winzeler | 74/674 |
| 4,185,520 | 1/1980 | Henneman et al. | 74/750 R |
| 4,328,954 | 5/1982 | Logus | 254/344 |

FOREIGN PATENT DOCUMENTS 878162 9/1961 United Kingdom .................. 192/87

*Primary Examiner*—Allan D. Herrmann
*Assistant Examiner*—Joseph M. Rolnicki
*Attorney, Agent, or Firm*—Charles E. Lanchantin, Jr.

[57] ABSTRACT

A winch apparatus (8) with a shift control mechanism (10) is disclosed for axially positioning a shaft (66) and effecting low and high speed raising of a load on a winch drum (24) and a centered neutral condition. The winch apparatus (8) advantageously includes first and second piston members (99,100) disposed within a housing (42) and mounted on the shaft (66), first means (122) for fluidically urging the first piston member (99) and the shaft (66) to a first position, second means (124) for fluidically urging the second piston member (100) and the shaft (66) to an opposite position, and centering means (126) for mechanically positioning the shaft (66) therebetween. Easier assembly of the winch apparatus (8) is featured.

14 Claims, 1 Drawing Figure

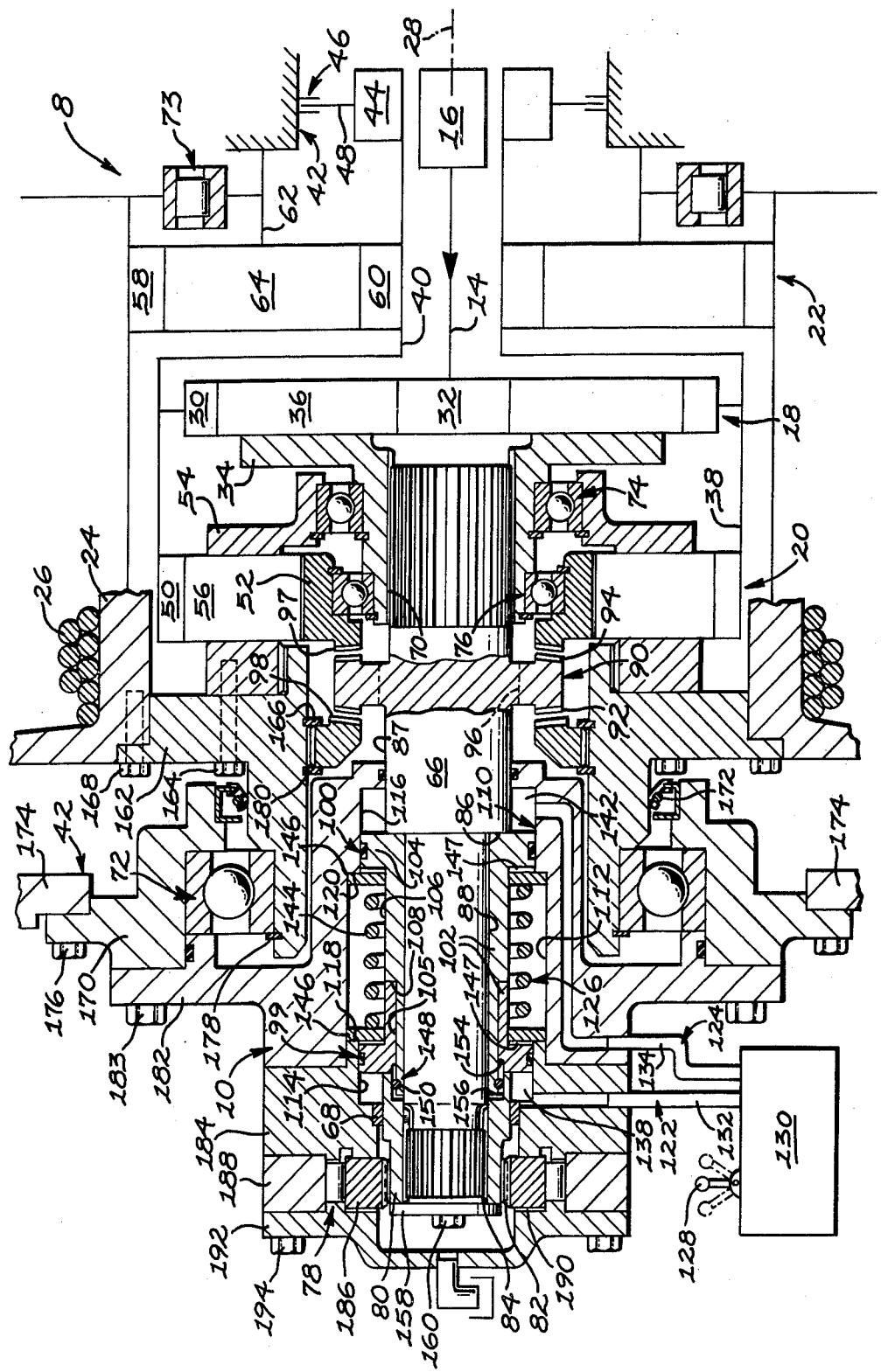

WINCH APPARATUS

DESCRIPTION

Technical Field

This invention relates generally to a winch apparatus and more particularly to a winch apparatus including a shift control mechanism for compactly and effectively positioning a shaft of a drive transmission in one of three positions.

Background Art

The winch construction disclosed in U.S. Pat. No. 4,161,126 issued July 17, 1979 to J. E. Winzeler provides two-speed load elevating capability and safe load lowering capability in a particularly advantageous package. The drive transmission thereof includes three interconnected planetary sets, an input shaft, a hollow shaft surrounding the input shaft, and an axially shiftable shaft connected to the winch housing via a one-way brake. In a first position of the shiftable shaft a load can be raised at a relatively low speed; in a second position the load can be raised relatively quickly; and in a third and centered position the load can be lowered.

While the winch construction of U.S. Pat. No. 4,161,126 is generally very satisfactory, the construction of the axially shiftable shaft is not as strong as is desired and the assembly thereof and the associated subassemblies is too difficult. Also, different fluid operating volumes are undesirably required to shift the shaft.

The present invention is directed to overcoming one or more of the problems as set forth above.

Disclosure of the Invention

In one aspect of the present invention a winch apparatus is provided which has a shift control mechanism having a shaft rotatably supported within a housing and including first and second piston members disposed within the housing and mounted on the shaft. First means are provided for fluidically urging the first piston member and the shaft to a first position, second means are provided for fluidically urging the second piston member and the shaft to a second position opposite the first, and centering means are provided for mechanically centering the shaft between the first and second positions in response to abutment with the piston members and the housing.

Advantageously, the shiftable shaft of the winch apparatus of the present invention is more rugged and provided with a shoulder. One of the piston members abuts the shoulder and the other piston member is telescopically mounted on the first piston member in such a manner that the centering means, including a single coiled compression spring and a pair of annular spring seats, can be entrapped between the piston members as a subassembly. Means are provided for releasably coupling and containing the piston members on the shiftable shaft.

Other features and advantages will readily become apparent from the following specification taken in connection with the accompanying drawings.

BRIEF DESCRIPTION OF THE DRAWINGS

The sole FIGURE is a diagrammatic elevational view of a winch apparatus illustrating an embodiment of the present invention with a portion thereof shown in section to better disclose details of its construction.

BEST MODE FOR CARRYING OUT THE INVENTION

A winch apparatus 8 includes a shift control mechanism 10 constructed in accordance with the present invention as is illustrated in the drawing. The winch has an input shaft 14 which is driven by a bidirectional, variable speed hydraulic motor 16. In general, the driven input shaft is cooperatively associated with first, second and third planetary gear sets 18,20 and 22 and the shift control mechanism 10 to selectively elevate a load by, for example, rotating a winch drum 24 and a cable 26 wrapped thereon in a clockwise direction about a central axis 28, or lowering a load by rotating the winch drum in a counterclockwise direction when viewing the winch from the right side of the drawing and looking along the axis.

The first or centrally located planetary gear set 18 includes a first ring gear element 30, a first sun gear element 32 and a first planet carrier element 34 of the usual type wherein a plurality of similar planet gear elements 36 are rotatably mounted on the carrier element and are in intermeshing toothed engagement with the ring and sun gears. In the instant embodiment the ring gear 30 is integrally connected to a bell-shaped housing 38 and also to a tubular shaft 40 for joint rotation therewith. The tubular shaft 40 is connected to a winch housing 42 via a serially arranged one-way clutch or overrunning clutch 44 and a conventional disc-type brake 46. The one-way clutch is of the usual roller type and has an outer race 48 connected to the normally spring-engaged and hydraulically disengaged brake. With this arrangement the tubular shaft 40 will overrun the clutch when it is driven in a counterclockwise direction when viewed along the axis from the right side of the drawing, but will be braked by the brake to the extent that it is engaged when it is rotated in a clockwise direction.

The second planetary gear set 20 similarly includes second ring gear, sun gear and planet carrier elements 50,52, and 54, with a plurality of planet gear elements 56 being rotatably mounted on the carrier element. As is illustrated, the second ring gear is connected for joint rotation to the bell-shaped housing 38 and the first ring gear 30. Also, the second planet carrier 54 is essentially connected for joint rotation to the winch drum 24.

The third planetary gear set 22 also includes third ring gear, sun gear and planet carrier elements 58,60 and 62, and a plurality of planet gear elements 64 rotatably mounted on the carrier element and in intermeshing engagement with the ring and sun gear elements. The third ring gear 58 is connected to the winch drum 24 for joint rotation, and the third planet carrier 62 is connected to the winch housing 42 and thus is continually held stationary. The third sun gear 60 is connected to the tubular shaft 40, so that it can be appreciated that the ring gears 30 and 50 and the sun gear 60 rotate as a unit.

An axially shiftable shaft 66 is rotatably supported by a bushing 68 to the winch housing 42 at the left end of the winch 8 when viewing the drawing, and by a spline connection 70 to the rotatable first planet carrier 34 at the right end thereof. The left end of the winch drum 24 is rotatably supported by a ball bearing assembly 72 to the winch housing 42 and the right end to the winch housing by a roller bearing assembly 73, and since the second planet carrier 54 is interconnected to the winch drum the second planet carrier serves to rotatably support the first planet carrier 34 through another ball bearing assembly 74. Still another ball bearing assembly 76 rotatably supports the second sun gear 52 on the first planet carrier 34.

More particularly, the axially shiftable shaft 66 is indirectly connected to the winch housing 42 by a conventional one-way, sprag-type brake 78 and an intermediate connecting tubular sleeve member 80 located at the left end thereof when viewing the drawing. With this arrangement the shaft 66 will overrun the brake 78 when it is rotated in a clockwise direction when viewed along the axis 28 from the right end. When it is urged in a counterclockwise direction the brake will keep it from rotating. The sleeve member 80 has an external spline connection 82 to the radially inner race of the sprag-type brake, and an internal spline connection 84 to the left end of the shaft 66.

The shiftable shaft 66 also has a leftwardly facing annular shoulder 86 defined thereon between a centrally disposed cylindrical surface 87 and a cylindrical mounting surface 88, and a radial outwardly extending coupling element 90 having toothed face gears 92 and 94 on the opposite sides thereof. Preferably, the coupling element 90 is a separate component which is electron beam welded to the main body of the shaft 66 along a cylindrical connecting surface 96 shown in broken lines. For low speed raising of a load on the winch drum 24 the right face gear 94 is coupled to a face gear 97 defined in the side of the second sun gear 52, and for high speed raising the left face gear 92 is coupled to a face gear 98 releasably connected to the winch drum 24.

Advantageously, the shift control mechanism 10 includes first and second piston members as indicated generally by the reference numbers 99 and 100. Each of the piston members has a tubular portion 102 and an annular flange portion 104. The tubular portion of the second or right piston member 100 is longer than that of the first or left piston member 99 and has stepped first and second cylindrical surfaces 105 and 106 defining a leftwardly facing annular shoulder 108 therebetween. Whereas the right piston member is mounted on the cylindrical surface 88 of the shiftable shaft 66, the left piston member is telescopically mounted on the first cylindrical surface 105 of the right piston member in abutment with the shoulder 108 in the fully installed condition. The left end of the winch housing 42 defines a stepped bore 110 concentrically disposed along the central axis 28. This stepped bore is defined in part by a centrally located enlarged cylindrical bore 112, slightly smaller in diameter cylindrical sealing surfaces 114 and 116 at the opposite ends of the enlarged bore, and a pair of inwardly facing annular shoulders 118,120 respectively disposed therebetween. Thus the left piston member 99 is slideably and sealingly disposed within the sealing surface 114 of the housing, and the right piston member 100 is similarly disposed within the sealing surface 116.

In accordance with a major aspect of the present invention, first means 122 is provided for fluidically urging the left piston member 99 and the shaft 66 toward a first or rightwardly located position corresponding to a low speed rate of elevating a load, second means 124 is provided for fluidically urging the right piston member 100 and the shaft 66 toward a second or leftwardly located position corresponding to a high speed rate of elevating a load, and centering means 126 is provided for mechanically centering the shaft in response to abutment with the piston members and the housing 42.

First means 122 includes a manually operable control lever 128 and associated control system 130 of the spool valve type such as is disclosed, for example, in U.S. Pat. No. 4,048,799 issued Sept. 20, 1977 to K. F. Golan, et al. Such control system is adapted to selectively communicate a source of fluid under pressure to a conduit and associated passage 132 with liquid to a level of, for example, 2,067 kPa (300 psi). The second means 124 can include the same control system such that placement of the control lever 128 in a second position is effective to alternatively pressurize a conduit and associated passage 134. In still a third position of the control lever the source of pressurized fluid can be blocked by the control system from both of these conduits and the conduits depressurized by communicating them back to a drain passage within the control system and not shown. Conduit and passage 132 lead to a first annular chamber 138 located to the left of first piston member 99. In a similar manner, conduit and passage 134 are in fluid communication with a second annular chamber 142. Thus, the first and second means 122,124 are effective to pressurize either the chamber 138 or the chamber 142, which chambers are defined at least in part by the housing and the piston members.

Centering means 126 preferably includes a single coiled compression spring 144 located generally between a pair of annular spring seats or races 146. As is illustrated, the spring seats are disposed in abutment with the shoulders 118 and 120 of the winch housing 42, and are disposed against the flange portions 104 of the piston members 99 and 100 through intermediate needle thrust bearings 147 in the centered position of the shiftable shaft 66.

During the initial assembly of the piston members 99 and 100, and the centering means 126 on the shaft 66, first containment means 148 are provided for holding the piston members a preselected distance apart with the spring 144 loadably contained therebetween. Containment means 148, in the instant example, preferably includes an interrupted circular snap ring 150 disposed in an annular recess defined in the cylindrical surface 105 of the second piston member 100. As a subassembly, the snap ring 150 is positively retained in place within an annular counterbore 154 in the first piston member 99. But in use, however, the snap ring is not located radially within counterbore 154, but within another juxtaposed counterbore 156 defined within the right end of the tubular sleeve member 80. In operation, the sleeve member 80 is urged fully to the right such that the piston members 99,100 are tightly clamped together by an end plate 158. The end plate is loadably engaged by a releasable fastener 160 screwthreadably engaged with the shaft 66.

Industrial Applicability

When it is desired to raise a load at low speed, as by taking in the cable 26 on the winch drum 24, the coupling element 90 is shifted to the right. This is achieved by directing hydraulic fluid under pressure to the first chamber 138 via the control system 130, and the conduit and passage 132. As a result of such pressurization the first piston member 99 is urged to the right when viewing the drawing compressing the centering means 126 against the right shoulder 120. The first piston member continually abuts the second piston member 100 and therefore urges it and the shiftable shaft 66 to the right such that the face gears 94 and 97 are interlockingly engaged. Hence, the sun gear 52 of the second planetary gear set 20 is coupled to the shiftable shaft and to the first planet carrier 34 for joint rotation before the input shaft 14 is rotated by the motor 16. When the input shaft is driven in a clockwise direction the drum will likewise be driven in a clockwise direction at a reduced speed whose ratio is determined by the gear ratios of the first, second and third planetary gear sets 18, 20 and 22. The tubular shaft 40 is driven in a counterclockwise direction in this mode of operation and overruns the one-way clutch 44. In the event of a power failure during elevating a load, the force of gravity acting on the load would attempt to unreel the cable 26 from the drum and rotate the drum in a counterclockwise manner. But the normally engaged brake 46 and the one-way clutch 44 would positively prevent the corresponding clockwise rotation of the tubular shaft and stop rotation of the drum in the undesired direction.

Raising the load at a high speed is accomplished by shifting the coupling element 90 to the left when viewing the drawing by directing fluid to the second chamber 142 by the second means 124. This is effective to connect the winch drum 24 for joint rotation with the second planet carrier 54 and the first planet carrier 34. With the input shaft 14 again being driven in a clockwise direction the drum will also be driven in a clockwise direction at a speed ratio determined by the gear ratios of the first and third planetary gear sets 18,22. Reverse rotation of the drum is prevented in the event of a power failure in the same way as in low speed raising of the load.

In order to controllably lower a load the coupling element 90 is placed in its neutral or centered position as is illustrated by opening both of the annular chambers 138 and 142 to drain and allowing the centering means 126 to place the shaft 66 in the central position. Hydraulic pressure is applied to the brake 46 in a well-known manner to release the brake to the desired degree and to allow the load on the winch drum 24 to rotate it in a counterclockwise direction and to allow the tubular shaft 40 to controllably rotate in a clockwise direction.

When it is desired to power the cable 26 off of the winch drum 24 the coupling element 90 is placed in its neutral position and the brake 46 is hydraulically disengaged. The input shaft 14 is rotated in the opposite or counterclockwise direction by reverse operation of the motor 16 and the sprag type brake 78 prevents the shiftable shaft 66 and first planet carrier 34 from rotating in a counterclockwise direction. With the brake 78 holding the first planet carrier 34 stationary under these conditions, the first ring gear 30 is forced to rotate in a clockwise direction along with the third sun gear 60, and this will drive the winch drum in a counterclockwise direction. Should the weight of the load on the cable 26 accelerate the rotational speed of the drum at a rate faster than that provided by the relative speed of the input shaft 14, the rate of rotation of the first ring gear 30 will increase to the point that the first planet carrier 34 will be driven in a condition to overrun the sprag type brake 78. Advantageously, this results in effectively disconnecting the first sun gear 32 and the motor 16 from the winch drum 24 so that the motor is not driven as a pump.

The assembly of the actuating portion or left side of the winch 12 is relatively simple, and is achieved after putting together several basic subassemblies. The first subassembly includes the first planet carrier 34 and its associated planet gears 36, and the second subassembly includes the second planet carrier 54 and its associated planet gears 56. The first and second subassemblies are then coupled together to define a third subassembly away from the winch drum 24. Bearing assembly 74 and its associated retaining rings, bearing assembly 76 and its retaining rings, and the second sun gear 52 form a part of such third subassembly along with a mounting flange 162. The mounting flange 162 is releasably secured to the second planet carrier 54 by a plurality of fasteners 164 advantageously screwthreadably installed into the carrier from the left or outside portion of the winch for easier serviceability. A rightwardly located internal retaining ring 166 is installed in the mounting flange 162 and the third subassembly is then inserted into and attached to the drum 24 by a plurality of fastening bolts 168.

Next, a bearing cage 170 including the bearing assembly 72 and a seal 172 basically make up a fourth subassembly and these are installed as by securing the cage to an outer housing wall 174 of the winch housing 42 as by a plurality of fastening bolts 176. A retaining ring 178 secures the inner race of the bearing assembly in place on the mounting flange 162 to enable the winch drum 24 to be basically fully rotatably supported within the winch housing.

The shiftable shaft 66 is then inserted into the spline connection 70 within the first planet carrier 34. Advantageously, the face gear 98 can be splinably inserted into position within the mounting flange 162 and axially against the retaining ring 166 and then another retaining ring 180 installed to secure it in place. An annular housing member 182 can then be secured in place as by a plurality of fastening bolts 183 to the bearing cage 170.

A fifth subassembly is defined by the first and second piston members 99,100, the spring 144, the spring seats 146, the bearings 147, and with the snap ring 150 disposed against the first piston member and containing the loading of the substantially compressed spring. This subassembly is installed over the shiftable shaft 66 and is anchored in place by the action of the fastening bolt 160. The bolt 160 is screwthreaded into the shaft so that the end plate 158 and the internally and externally splined sleeve member 80 is urged against the first piston member 99 and the spring compressed.

Lastly, the outer end members associated with the sprag type brake 78 are installed including a support assembly 184, the brake 78 including inner and outer races 186,188, a drag spring 190, and a cover 192, as by a plurality of fastening bolts 194 screwthreadably connected to the housing member 182.

Thus it can be appreciated that the winch 8 can be assembled, or disassembled, in a relatively convenient way. Advantageously, the shiftable shaft 66 can be installed or released for servicing with the mounting flange 162 maintained in its installed position such as to continue to rotatably support the winch drum 24. For example, with the removal of the housing member 182 and other external parts to the left thereof in the drawing, and also the face gear 98, the shiftable shaft and coupling element 90 can be axially removed from within the generous inside diameter or bore of the mounting flange 162. This was not possible with the construction of U.S. Pat. No. 4,161,126.

Moreover, the first and second piston members 99,100 and the centering means 126 can be installed or removed as a self-contained subassembly on the shiftable shaft, and with the piston members and winch housing 42 generally defining operating chambers 138 and 142 with equal operating volumes. The latter feature is beneficial from the standpoint that the operatively associated control system 130 can easily provide a similar rate of response for both high and low speed operation. In contrast, the prior art winch of U.S. Pat. No. 4,161,126 does not have positively cooperating first and second piston members or equal volume operating chambers 138,142.

Other aspects, objects and advantages of this invention can be obtained from a study of the drawings, the disclosure and the appended claims.

What is claimed is:

1. In a winch apparatus (8) having a shift control mechanism (10) including a shaft (66) rotatably supported within a housing (42) on a central axis (28), the improvement comprising:
   first and second piston members (99,100) fixedly mounted on the shaft (66), axially slideably disposed within the housing (42), and at least in part defining with the housing (42) first and second annular chambers (138,142) having substantially equal operating volumes;
   first means (122) for fluidically urging the first piston member (99) and the shaft (66) in a first direction toward a first piston by pressurizing the first chamber (138);
   second means (124) for fluidically urging the second piston member (100) and the shaft (66) in a direction opposite the first direction toward a second position by pressurizing the second chamber (142); and
   centering means (126) for mechanically centering the shaft (66) between the first and second positions in response to abutment with the piston members (99,100) and the housing (42).

2. The winch apparatus (8) of claim 1 wherein the centering means (126) includes a compression spring (144) and first and second annular spring seats (146), the compression spring (144) being in abutment with the spring seats (146).

3. The winch apparatus (8) of claim 2 wherein the centering means (126) includes first and second bearings (147) located axially outwardly of the spring seats (146).

4. The winch apparatus (8) of claim 3 wherein the housing (42) includes an enlarged bore (112) having shoulders (118,120) at the opposite ends of the bore (112), the spring seats (146) being respectively seated against the shoulders (118,120) in the centered position of the shaft (66).

5. The winch apparatus (8) of claim 4 wherein each of the piston members (99,100) has an annular flange (104) and the bearings (147) individually abut the respective flange (104).

6. The winch apparatus (8) of claim 1 wherein each of the piston members (99,100) has a tubular portion (102) and an annular flange portion (104) and the tubular portions (102) telescopically overlap.

7. The winch apparatus (8) of claim 6 wherein the centering means (126) acts against the flange portions (104) in the centered position of the shaft (66).

8. The winch apparatus (8) of claim 7 including means (150) for containing the centering means (126) between the flange portions (104) during initial assembly.

9. The winch apparatus (8) of claim 1 wherein the shaft (66) has a shoulder (86), the second piston member (100) is in abutment with the shoulder (86), and the first piston member (99) is in facing abutment with the second piston member (100) with the centering means (126) disposed therebetween.

10. The winch apparatus (8) of claim 9 wherein the centering means (126) includes a single compression spring (144).

11. The winch apparatus (8) of claim 10 including means (80,158,160) for restraining separation of the first and second piston members (99,100) in response to the loading of the compression spring (144).

12. The winch apparatus (8) of claim 10 wherein the shaft (66) defines a radially outwardly extending coupling element (90) having toothed face gears (92,94) on the opposite sides thereof.

13. The winch apparatus (8) of claim 1 wherein the centering means (126) includes a pair of spring seats (146), a single compression spring (144) generally disposed between the spring seats (146) and a pair of bearings (147).

14. The winch apparatus (8) of claim 13 wherein the housing (42) has a cylindrical bore (112) defining annular shoulders (118,120) at the axially opposite ends thereof, the spring seats (146) being disposed against the respective shoulders (118,120) in the centered position of the shaft (66).

* * * * *